(12) United States Patent  
Singletary

(10) Patent No.: US 8,516,741 B2  
(45) Date of Patent: Aug. 27, 2013

(54) SILICA BASED PLANT GROWTH MEDIUM

(75) Inventor: Steven Singletary, Tar Heel, NC (US)

(73) Assignee: Fayetteville State University, Fayetteville, NC (US)

( * ) Notice: Subject to any disclaimer, the term of this patent is extended or adjusted under 35 U.S.C. 154(b) by 2 days.

(21) Appl. No.: 12/635,084

(22) Filed: Dec. 10, 2009

(65) Prior Publication Data

US 2011/0138690 A1    Jun. 16, 2011

(51) Int. Cl.  
*A01C 1/06*    (2006.01)

(52) U.S. Cl.  
USPC .......................................... 47/57.6

(58) Field of Classification Search  
USPC ................ 47/59 S, 56, 57.6, 58.1 R, 58.1 SE  
See application file for complete search history.

(56) References Cited

U.S. PATENT DOCUMENTS

| | | | |
|---|---|---|---|
| 3,997,484 A | 12/1976 | Weaver et al. | |
| 4,927,455 A | 5/1990 | Hotta et al. | |
| 6,074,988 A | 6/2000 | King et al. | |
| 2002/0095864 A1* | 7/2002 | Obert et al. | 47/57.6 |
| 2003/0213169 A1* | 11/2003 | Allen | 47/58.1 R |
| 2004/0148854 A1* | 8/2004 | Doane et al. | 47/57.6 |
| 2005/0108936 A1* | 5/2005 | Hartle et al. | 47/57.6 |
| 2005/0150161 A1* | 7/2005 | Hartle et al. | 47/58.1 SE |
| 2006/0107589 A1* | 5/2006 | Rubin | 47/59 S |
| 2006/0150495 A1* | 7/2006 | MacConnell | 47/59 S |
| 2007/0196427 A1* | 8/2007 | Jokinen et al. | 424/426 |
| 2008/0005808 A1* | 1/2008 | Wang et al. | 800/276 |

FOREIGN PATENT DOCUMENTS

DE    39 17 463 A1    12/1989

OTHER PUBLICATIONS

Nottingham Company, Performance Based Silica for Diverse Applications, http://www.ppiatlanta.com/pdfs/Silica/Silica_Fumed_Web.pdf, May 2007.*  
Nottingham Company, Performance Based Silica for Diverse Applications, Brochure of May 2007.*  
International Search Report of counterpart Application No. PCT/US2010/059839 mailed Jun. 22, 2011.  
Anonymous; "WaterSmart, How to Mix, House Plants," Crystals.us, Apr. 2009, accessed at http://replay.web.archive.org/20090430075321/http://crystals.us/wswatersmart.htm on May 12, 2011.

* cited by examiner

*Primary Examiner* — Son T Nguyen  
*Assistant Examiner* — Shadi Baniani  
(74) *Attorney, Agent, or Firm* — Summa, Additon & Ashe, P.A.

(57) ABSTRACT

A method and associated composition for growing plants is disclosed. The method includes the steps of mixing a gel precursor that is characterized by the ability to absorb water, form a viscous gel, provide water and nutrition to a plant, and remain capable of being reconstituted with a fresh supply of water, with a gel-forming nutrient composition in an amount sufficient to create a viscous gel, and adding a plant item selected from the group consisting of seeds and seedlings to the gel. An associated gel composition is disclosed that includes a gel precursor that is characterized by the ability to absorb water, form a viscous gel, provide water and nutrition to a plant, and remain capable of being reconstituted with a fresh supply of water, a plant nutrient composition, and a plant item selected from the group consisting of seeds and seedlings.

3 Claims, 2 Drawing Sheets

SILICA BASED PLANT GROWTH MEDIUM

BACKGROUND

The present invention relates to the growth of plants in unconventional media.

In order to grow, plants require adequate water, light, appropriate temperatures, oxygen, and gas exchange with their root tissue. In natural or near-natural environments, these needs are met by sunlight, rainfall, the local climate, and soil. In certain well-understood artificial environments, such as a greenhouse or other indoor growth facility, sunlight may be replaced or complemented by artificial light, rainfall can be replaced with manual or automatic irrigation, the temperature can be controlled artificially, and the soil (or a soil substitute) and fertilizers can be selected and blended for optimum growth.

Other environments present more difficult challenges. In "outer space" (i.e., earth-orbital or beyond-orbital locations), plants, animals and human beings can only survive in artificial environments that provide oxygen, water, and nutrition. Since the beginning of the space age, scientists have obviously recognized that long term human presence in orbital or beyond-orbital locations will require a corresponding long-term food supply sufficient to maintain the good health of space travelers (astronauts).

One solution is, of course, to carry food supplies from the Earth's surface to the orbital or beyond-orbital destination. For orbital missions the necessary food is typically either included with the original launch or replenished with additional travel to orbital locations; e.g. shuttle flights to the ISS. Even lunar missions (e.g., Apollo) can operate to some extent using this system. Although this has been the method of choice since the beginning of manned spaceflight in the early 1960s, it is phenomenally expensive; e.g., a cost of approximately $10,000 per pound at current prices to reach Earth orbit. Destinations beyond Earth orbit are obviously increasingly more expensive.

For example, the current International Space Station (ISS) typically sustains three crew members who require approximately 4 tons of supplies every six months. This means that launching such supplies costs approximately $80 million at current prices, not including the cost of the supplies or their preparation.

Manned missions beyond earth orbit, such as missions to Mars, will, however, require greater—much greater—amounts of life-sustaining supplies, including food. By way of comparison, using current technology, travel from the Earth to the Moon takes approximately 3 days, while travel to the nearest planetary neighbor (Mars) is expected to take at least six months and potentially longer.

Accordingly, significant interest exists in techniques for cultivating plants in space and doing so in a manner that can provide a partial or completely self-sustaining food supply over extended periods of time. In one sense, a plant represents a natural nanotechnology in which a very small, minimal-weight item—a seed—has the potential to produce enormously larger amounts of food and to also produce more seeds from which more food can be grown.

Additionally, plants are part of the natural cycle that converts carbon dioxide into oxygen. As a result, the growth of plants in a space environment has the potential to at least complement and potentially replace artificial technology for removing carbon dioxide from the atmosphere and to similarly complement or replace the need to carry oxygen.

Conducting agriculture in space on a large scale, however, raises problems with respect to both the space technology and the plants themselves. A spacecraft represents a sealed environment, operates in a microgravity or zero-gravity environment, and depends upon sophisticated mechanical and electronic components. In many circumstances, water and typical agricultural chemicals (fertilizers, acids, nitrates, phosphates) are likely to react unfavorably with a number of such electronic and mechanical items, thereby reducing (or destroying) their performance capabilities.

Apart from the previous problems, a low or zero gravity environment also raises issues with respect to the normal cultivation of plants. For example, water diffusion is quite different in a low or zero gravity environment than on Earth. On earth, gravity is the dominant force acting on water diffusion. Under zero or reduced gravity, however, capillary forces become dominant and thus create water distribution patterns different from those on Earth.

The lack of gravity is also likely to alter the nature of liquid and gas exchange between plant roots and their growth medium (e.g., soil in a natural environment; a supplemented soil or soil substitute in a space environment). Gas exchange within a growth medium is, however, typically a factor in plant root growth. Normally, soil, or another porous medium provides support for the root network and facilitates the supply and storage of liquids and nutrients to the plant. Roots also respire to a certain extent and thus contribute to the exchange of carbon dioxide and oxygen. Plants also physically react to both gravity and light.

Additionally, constraints on the physical space available in a spacecraft (or any other confined space) tends to encourage the use of agriculture in containerized systems where plant roots are restricted to relatively small volumes, particularly in comparison to the space that would be available in native soil. Such restricted volume reduces the water storage capacity of the growth medium, reduces the surface area for root absorption, and tends to create a water table at the bottom of the container that can raise aeration problems.

Low gravity also changes the nature of gas exchange. On Earth, when plants are grown in porous substrates (soil or soil replacement) the media tends to drain easily after watering to in turn provide air filled space that permits gas exchange with the root tissues of the plant. In the absence of gravity, some other technique must be used to drain the growth media in a manner that complements the needs of the root and the remainder of the plant.

SUMMARY

In one aspect, the invention is a method of growing plants by mixing a gel precursor that is characterized by the ability to absorb water, form a viscous gel, provide water and nutrition to a plant, and remain capable of being reconstituted with a fresh supply of water, with a gel-forming nutrient composition in an amount sufficient to create a viscous gel, and adding a plant item selected from the group consisting of seeds and seedlings to the gel.

In another aspect, the invention is a method of growing plants comprising mixing fumed amorphous silica with water and nutrient compositions in an amount sufficient to create a gel with a viscosity sufficient to preclude the gel from flow, shear or collapse even under the influence of gravity, and adding a plant item selected from the group consisting of seeds and seedlings to the gel.

In another aspect, the invention is a combination of a gel that includes a gel precursor that is characterized by the ability to absorb water, form a viscous gel, provide water and nutrition to a plant, and remain capable of being reconstituted with a fresh supply of water, and a plant nutrient composition, and a plant item selected from the group consisting of seeds and seedlings.

In each aspect, the invention is particularly suitable for use in low-gravity or zero gravity environments.

The foregoing and other objects and advantages of the invention and the manner in which the same are accomplished will become clearer based on the followed detailed description taken in conjunction with the accompanying drawings.

DETAILED DESCRIPTION

Figure 1:
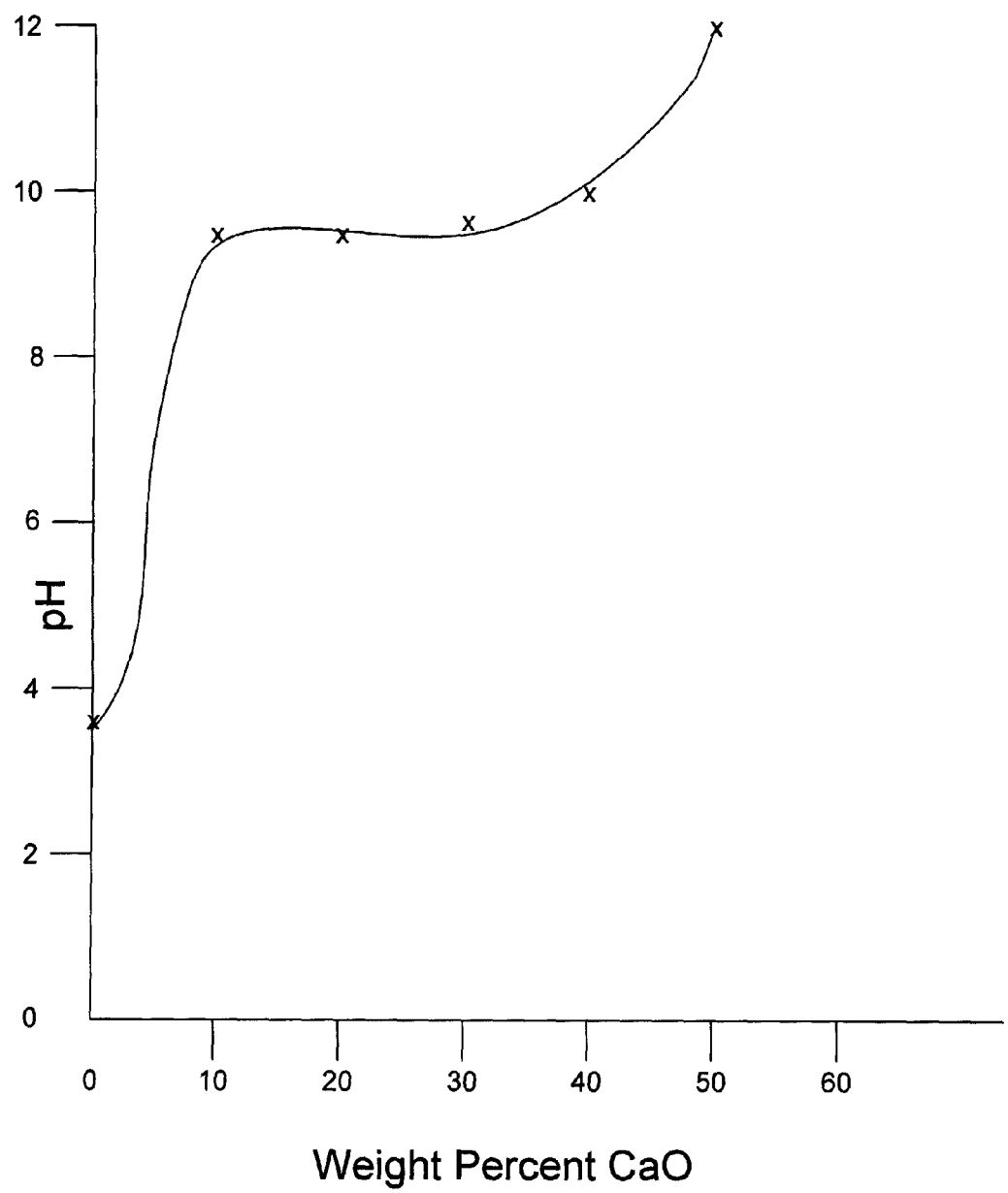
FIG. 1 is a plot of the pH of a gel according to the invention against the weight percent of calcium oxide buffer in the gel.

In a first aspect, the invention is a method of growing plants—including growing plants in a minimal gravity environment—by mixing a gel precursor that is characterized by the ability to absorb water, to form a viscous gel, to provide water and nutrition to a plant, and to remain capable of being reconstituted with a fresh supply of water, with a gel-forming nutrient composition in an amount sufficient to create a viscous gel and then adding a plant item selected from the group consisting of seeds and seedlings to the gel.

As used herein, the term "minimal gravity environment" includes low-gravity, micro-gravity and zero-gravity environments.

In exemplary embodiments, fumed amorphous silica serves as the gel precursor. The fumed amorphous silica and the nutrient composition are formed in a proportion that produces a gel with a viscosity sufficient to maintain the gel in an overturned container (for a reasonable period of time) even under the influence of gravity. Most typically, this will comprise mixing the fumed amorphous silica with an aqueous solution of a nutrient composition that includes one or more of nitrogen-containing compounds, phosphorus-containing compositions and potassium containing compositions.

The plant item can be selected from a wide variety of plants capable of extracting water from the gel, with exemplary plants including mizuma, tomatoes, peas, peppers, soybeans, rice, and coleus.

If necessary, the seed or seedling can be a plant that is resistant to negative effects from the increased amount of radiation that can be expected outside of the Earth's atmosphere. Of course, if a space vehicle is designed to protect humans from radiation, such protection should also be sufficient for many (or all) plant species.

In some embodiments, helpful bacteria (e.g., a probiotic) can be added to the gel as desired or necessary to enhance the growth characteristics.

Considered in another aspect, the invention is a method of growing plants by mixing fumed amorphous silica with water and nutrient compositions in an amount sufficient to create a gel with the viscosity sufficient to preclude the gel from flow, shear or collapse, even under the influence of gravity, and then adding a plant item selected from the group consisting of seeds or seedlings to the gel. In some cases, the seed can be added to the original mixture before the gel forms.

In the method, the fumed amorphous silica and aqueous solution of nutrient composition are mixed in a proportion of one part by weight of fumed amorphous silica to between about 5 and 15 parts by weight of the nutrient solution, more preferably between about 8 and 12 parts by weight of the solution, and most preferably one part by weight of fumed amorphous silica to about 10 parts by weight of the solution.

As noted above, when starting with a seed, the method can include mixing the seed with the fumed amorphous silica, the water, and the nutrient compositions. When starting with a seedling, the seedling is typically added to the viscous gel before it sets completely.

As mentioned herein, fumed amorphous silica demonstrates the advantageous ability to reconstitute as a gel when water is added to a gel that has dried ("dried" being understood to be a relative term in these circumstances). Thus, the method can further comprise the steps of growing the seed or seedling to a desired maturity, removing the mature plant from the gel, reconstituting the gel by adding an aqueous nutrient solution, and then adding a second seed or seedling to the reconstituted gel. As with respect to the original mixture, where a seed is added, it can be mixed with the water and the gel to be reconstituted, and when a seedling is used, it will be typically added to the reconstituted gel.

In yet another aspect, the invention is the combination of a gel that includes a gel precursor that is characterized by the ability to absorb water, to form a viscous gel, to provide water and nutrition to a plant, and to remain capable of being reconstituted with a fresh supply of water (including water-based nutrient solutions). The combination includes a plant nutrient composition and a plant item selected from the group consisting of seeds and seedlings.

In this embodiment, the gel comprises a semisolid mixture of fumed amorphous silica and an aqueous solution of plant nutrient compositions. The plant nutrient compositions can be selected as desired or needed provided they are otherwise compatible with the gel and the plant. In typical circumstances, the nutrient composition will include one or more of a nitrogen-containing composition, a phosphorus containing composition, and a potassium containing composition.

As in the method embodiments, the plant item (seed or seedling) can be any appropriate plant that will grow using the method, and an exemplary group would include tomatoes, peas, radishes, peppers, soybeans, rice and Coleus.

It will accordingly be recognized that, when using the method, plants can be grown for different purposes. Some plants will provide food, others may provide fiber or other constituents for a non-food purpose, most will absorb carbon dioxide and produce oxygen, and some can be included even for aesthetic purposes (which, given the length of long-term space travel missions, may be important from a psychological standpoint).

The gel has a viscosity sufficient to preclude flow, shear, or collapse, even under the influence of gravity. It will be understood that although the method of the invention has usefulness in micro gravity conditions, the behavior of the gel under gravity is an appropriate way to describe the gel and its viscosity and persons of skill in this art will recognize the appropriate viscosity ranges that meet these characteristics.

As in the method aspects of the invention, the gel is formed of a mixture of fumed amorphous silica and an aqueous solution of nutrients with a mixture of about one part by weight of the fumed silica to about 10 parts by weight of aqueous solution being currently exemplary.

The growth media (gel) can be reconstituted with water when dry and is capable of supporting the growth of a variety of plants and plant types.

Fumed silica is pure silicon dioxide typically formed by oxidizing vaporized silicon tetrachloride in a high temperature flame with excess hydrogen and oxygen. Fumed silica is also known as pyrogenic silica and is characterized as noncrystalline, with very fine grain and much less density (and much more surface area) than ordinary silicon dioxide.

Fumed silica can also be produced by vaporizing quartz sand at high temperatures (e.g. 3000° C.).

In typical commercial use, fumed silica can act as a universal thickening agent, a thickening agent in food products, and an anti-caking agent in powdered products. It has similar desiccant properties to silica gel and in some circumstances can be used as a light abrasive (e.g., toothpaste).

Fumed silica suitable for purposes of the invention is available under the name "AEROSIL" from Evonik Degussa Corporation, Parsippany, N.J. 07054 USA. It is categorized under Chemical Abstracts Service Registry No. 67256-35-3. Some types of fumed silica are also known as "cab-o-sil or "cabo-sil."

Fumed silica typically has a furry fine particle size and is categorized as an aerogel. It contains about 94% dead air space and has a density of about 2.3 pounds per cubic foot.

Fumed silica is also referred to as a "silicate" gel or as "dioxosilane."

The term "gel" is used here in a somewhat broad sense. For example, Lewis, HAWLEYS CONDENSED CHEMICAL DICTIONARY, 11th Edition, von Nostrand Reinhold (1987) defines a gel as a colloid in which the dispersed phase has combined with the continuous phase to produce a viscous jelly-like product. According to this definition, "a gel is made by cooling a solution whereupon certain kinds of solutes (gelatin) form sub microscopic crystalline particle groups which retain much solvent in the interstices."

The present invention is not limited to this dictionary definition of "gel."

Without being bound by theory, the inventor believes that the fumed silica is absorbing water in a physical relationship to form a semi-solid composition that has many of the properties of a classically-defined gel, but which does not necessarily include gelatin (proteins) and does not necessarily form sub microscopic crystalline particle groups in the manner set forth in the formal definition.

Other conventional gel forming materials such as the natural products (e.g., agar and related products and derivatives) will form an initial usable gel. Once the gel is formed, however, it generally is not possible to dehydrate the gel and reconstitute the gel-forming material. Thus, for example, agar, once it has been gelled, is sufficiently changed from its starting composition that it cannot be successfully reused even if another nutrient solution was added to it.

Stated differently, once an agar gel is formed and used to grow a plant (e.g. U.S. Pat. No. 4,927,455), the original agar cannot be recovered or reused.

In contrast, the apparent manner in which the fumed amorphous silica absorbs water rather than reacting with it enables fumed amorphous silica to be recovered after a plant growth cycle and to be reused to form a new gel to grow a new plant once a new nutrient solution is added. The capacity to reuse the fumed silica for repeated growth cycles offers a significant advantage over conventional gel forming materials because only a single (or a few) initial charges of the fumed silica need be incorporated. The initial amount of fumed silica will continue to provide cultivation capability as long as a supply of water and nutrients are available to mix with it.

Therefore, other materials that demonstrate the same ability to absorb water, form a viscous gel, provide water and nutrition to a plant, and remain capable of being reconstituted with a fresh supply of water, will be acceptable in the invention provided they are otherwise compatible with the intended seed, the growing plant, and the nutrients.

The viscosity of the gel can be controlled by controlling the ratio of silica to liquid, preferably within the ranges set forth herein.

The pH of gels formed from fumed amorphous silica tends to be acidic (often 3.0-4.0). Thus, the gel can be buffered as necessary to keep the pH at or near a value that will successfully support plant growth, typically at or near neutral (pH=7).

Accordingly, a buffer composition can be added to the mixture as part of the step of forming the gel. The buffer composition should be compatible with the other aspects of the invention including the gel forming capabilities of the precursor, the nutrient compositions, the seeds, and the growing plant. Calcium oxide (CaO) provides an appropriate buffer composition for these purposes, but the skilled person will recognize other compositions that are similarly suitable.

FIG. 1 plots the pH value obtained for various rates of calcium oxide added to buffer the gel. As illustrated in FIG. 1, a weight percentage of calcium oxide of between about 1 and 2% provides a pH at the optimal level between about 6.0 and 7.0. The proper pH is necessary for both inducing germination of the seed and substantial growth of the resulting plant. By keeping the gel as close as possible to a neutral pH, plant growth takes place in a media that is more comparable to that of soil found in nature. Without the buffer, the pH of the media will normally range from about 3.0-4.0.

As an item for potential further study, soybean seeds did not germinate as easily as did some other plants in the gel, but once germinated, grew well. Soybeans are an advantageous plant, because their use in many food products is well understood and they can be used to manufacture nonfood products including (among others) inks, hydrocarbon fuels, fibers, and waxes.

Figure 2:
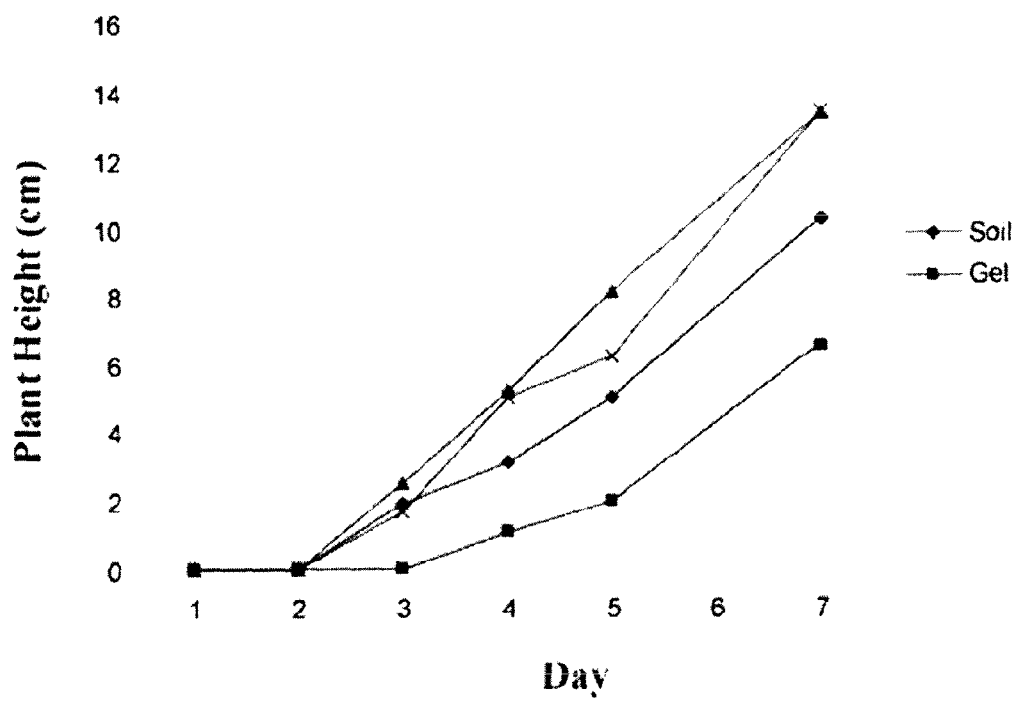
FIG. 2 is a plot of plant height in centimeters plotted against days of growth for plants comparatively grown in soil and in a gel according to the present invention.

FIG. 2 is a plot of soybean growth in soil versus soybean growth in the gel according to the present invention showing successful growth of soybeans in the gel. A visible inspection of the plants showed that a soybean plant will develop a thorough and helpful root system in the gel according to the present invention.

In the drawings and specification there has been set forth a preferred embodiment of the invention, and although specific terms have been employed, they are used in a generic and descriptive sense only and not for purposes of limitation, the scope of the invention being defined in the claims.

The invention claimed is:

1. A plant growth combination comprising:
   a gel formed of a semisolid mixture of fumed amorphous silica and an aqueous solution of plant nutrient compositions in a proportion of 1 part by weight of fumed amorphous silica to between about 5 and 15 parts by weight of solution;
   said nutrient composition being selected from the group consisting of nitrogen-containing compositions, phosphorus-containing compositions, potassium-containing compositions, and combinations thereof;
   a buffer composition that helps maintain a desired pH; and
   a plant item in said gel-nutrient mixture, said plant item being selected from the group consisting of seeds and seedlings.

2. A combination according to claim 1 wherein said plant item is selected from the group consisting of mizuna, tomatos, peas, radishes, peppers, soybeans, rice and coleus.

3. A combination according to claim 1 comprising fumed amorphous silica and an aqueous solution of nutrient compositions in a proportion of 1 part by weight of fumed amorphous silica to about 10 parts by weight of solution.

* * * * *